United States Patent [19]

Shieh et al.

[11] Patent Number: 5,278,901
[45] Date of Patent: Jan. 11, 1994

[54] PATTERN-ORIENTED INTRUSION-DETECTION SYSTEM AND METHOD

[75] Inventors: Shiuh-Pyung W. Shieh, Hsinchu, Taiwan; Virgil D. Gligor, Chevy Chase, Md.

[73] Assignee: International Business Machines Corporation, Armonk, N.Y.

[21] Appl. No.: 875,943

[22] Filed: Apr. 30, 1992

[51] Int. Cl.$^5$ .............................................. H04L 9/00
[52] U.S. Cl. ......................................... 380/4; 380/23; 380/25; 380/49; 380/50
[58] Field of Search ...................... 380/3, 4, 23, 24, 25, 380/49, 50, 52, 59; 367/93, 94; 342/27, 28, 195

[56] References Cited

U.S. PATENT DOCUMENTS

| | | | |
|---|---|---|---|
| 4,124,848 | 11/1978 | Clark et al. | 342/27 X |
| 4,639,902 | 1/1987 | Leverance et al. | 367/93 |
| 4,685,056 | 8/1987 | Barnsdale, Jr. et al. | 395/425 |
| 4,845,682 | 7/1989 | Boozer et al. | 367/93 |
| 4,975,950 | 12/1990 | Lentz | 380/4 |
| 5,117,457 | 5/1992 | Comerford et al. | 380/3 |

OTHER PUBLICATIONS

Jim Carlstedt et al., "Pattern-Directed Protection Evaluation", Information Sciences Institute Research Paper No. ISI/RR-75-31, Jun. 1975.
Shieh et al., "Auditing the Use of Covert Storage Channels in Secure Systems", Proc. of the 1990 IEEE Symposium on Research in Security and Privacy, Oakland, Calif., May 6-9, 1990, pp. 285-295.
A. H. Karp, "Protecting Against Infection by Computer Viruses", IBM Technical Disclosure Bulletin, vol. 33, No. 2, Jul. 1990, pp. 318-320.
Shieh et al., "A Pattern-Oriented Intrusion-Detection Model and Its Applications", Proc. of the 1991 IEEE Symposium on Research in Security and Privacy, Oakland, Calif., May 20-22, 1991.

Primary Examiner—Bernarr E. Gregory
Attorney, Agent, or Firm—Sterne, Kessler, Goldstein & Fox

[57] ABSTRACT

The present invention provides a pattern-oriented intrusion detection system and method that defines patterns of intrusion based on object privilege and information flow in secure computer systems to detect actual intrusion occurrences. This approach has the advantage of detecting context-dependent intrusions such as those caused by inadvertent execution of foreign programs containing viruses or Trojan Horses and also those caused by unintended use of foreign input data. The present invention can track both information and privilege flows within a system, and has the ability to uniformly define various types of intrusion patterns. Operational security problems can lead to intrusion in secure computer systems. With this approach, explicitly defined types of intrusion patterns due to operational security problems can be detected.

49 Claims, 12 Drawing Sheets $$S_i \bigcirc \xrightarrow{r/r^*} \square O_m$$

$$S_m \bigcirc \xrightarrow{w/w^*} \square O_n$$

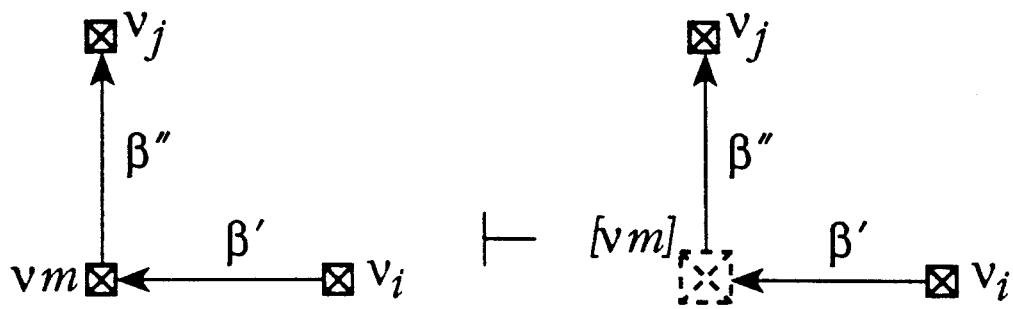
FIG. 21
FIG. 22
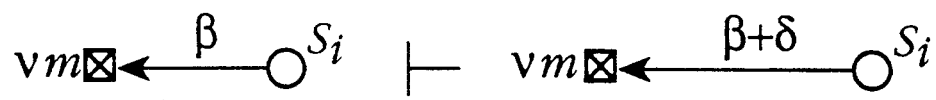
FIG. 23
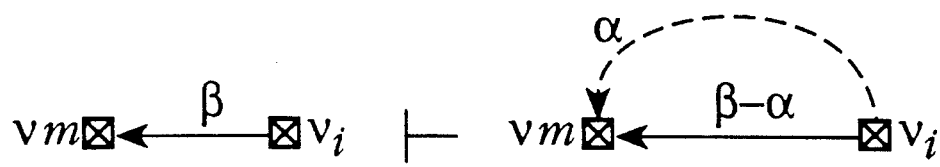
FIG. 24
TIME: 10:01
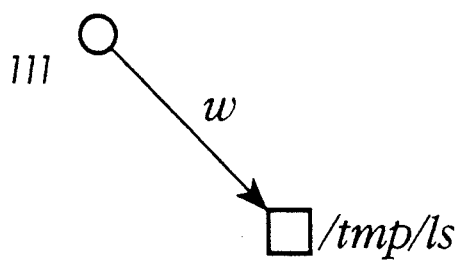
FIG. 25A

TIME: 11:03

PATTERN-ORIENTED INTRUSION-DETECTION SYSTEM AND METHOD

DESCRIPTION

1. Technical Field

The present invention relates generally to intrusion detection for a computer-based system and, more particularly, to a pattern-oriented, intrusion-detection system and method that can be used to analyze privilege and data flows in secure computer systems to detect operational security problems.

2. Background Art

Computer system intrusion typically occurs as a result of either system penetration or operational security problems caused by misuse of access authorization. In principle, access control and authentication mechanisms can provide the penetration resistance necessary to prevent illegitimate access by unauthorized users. However, intrusion resulting from operational security problems can be prevented by neither authentication nor access control since unauthorized access need not be attempted. Instead, this type of intrusion must be detected by after-the-fact analysis of audit trails, that is, by intrusion detection.

Most intrusion-detection methods proposed to date define intrusion patterns as statistical deviations from an activity profile that characterizes the "typical" access behavior of a given subject (i.e., user or process) or group of subjects with respect to a given object (e.g., a file or a directory) or group of objects (see Clyde, A. R., *Insider Threat Identification Systems*. Proc. of the 10th Ntl. Comp. Sec. Conf., pp. 343-356, Baltimore, Md. (October 1987); Denning, D. E. *An Intrusion Detection Model*, IEEE Trans. on Software Eng., Vol 13-2, pp. 222-226 (Feb. 1987), Lunt et al., *A Protection Real Time Intrusion Detection Expert System*. Proc. of the 1988 IEEE Symposium on Sec. and Priv., pp. 59-66 Oakland, Calif. (April 1988); Lunt, T. F., *Automated Audit Trail Analysis and Intrusion Detection*, Proc. of the 11th Ntl. Comp. Sec. Conf., pp. 65-73, Baltimore, Md. (Oct. 1988); Smaha, S. E., *An Intrusion Detection System*, Proc. of the 4th Aerospace Comp. Sec. Appln. Conf., pp. 37-44, Orlando, Fla. (December 1988); and Vaccaro, et al., *Detection of Anomalous Computer Session Activity* Proc. of the 1989 IEEE Symp. on Sec. and Privacy, pp. 280-289, Oakland, Calif. (May 1-3 1989)). Activity profiles attempt to capture statistically the normal access activity of subjects during a given period of system operation. A key advantage of these methods is that intrusion patterns need not be defined explicitly, thereby enabling detection of new, unanticipated intrusion patterns. However, these methods are generally unable to adapt easily to changes of subject behavior; for example, changes legitimately caused by the use of new applications.

A method that adapts intrusion detection to subject behavior is presented in Teng, et al., *Adaptive Real-time Anomaly Detection Using Inductively Generated Sequential Patterns*, Proc. of the 1990 IEEE Symp. on Res. in Sec. and Privacy pp. 278-284, Oakland, Calif. (May 6-9, 1990). This method uses sequential rules that are dynamically generated and modified by a time-based, inductive engine to define expected user-activity profiles. However, its effectiveness is somewhat limited whenever the intrusion patterns include sequences of events in which both the size of the subject and object sets and the length of the sequence itself vary in time. Both this method and those based on statistical definitions of intrusion patterns are rather insensitive to occurrences of context-dependent intrusions, such as those characterizing covert-channel use or virus propagation. Insensitivity to context-dependent intrusion may lead to failure to detect some intrusion instances and may cause false alarms to be raised. This limitation is shared by all intrusion-detection methods that ignore the meaning and significance of event sequences in defining intrusion patterns.

DISCLOSURE OF INVENTION

The present invention provides a pattern-oriented intrusion detection system and method that defines patterns of intrusion based on object privilege and information flow in secure computer systems to detect actual intrusion occurrences. This approach has the advantage of detecting context-dependent intrusions such as those caused by inadvertent execution of foreign programs containing viruses or Trojan Horses and also those caused by unintended use of foreign input data. The present invention can track both information and privilege flows within a system, and has the ability to uniformly define various types of intrusion patterns. Operational security problems can lead to intrusion in secure computer systems. With this approach, explicitly defined types of intrusion patterns due to operational security problems can be detected.

In particular, the present invention provides a system and method for detecting intrusion patterns in a secure computer-based system having a Central Processing Unit and a data storage memory. The present invention has means for inputting access operations and a protection graph into an intrusion detection system. The protection graph includes direct and indirect relations between subjects and objects. Means are provided for generating a new protection graph by applying a set of model rules and generating exception conditions based on a comparison of the new protection graph and a set of intrusion patterns.

BRIEF DESCRIPTION OF DRAWINGS

The foregoing and other features and advantages of the invention will be apparent from the following more particular description of preferred embodiments of the invention, as illustrated in the accompanying drawings, in which:

FIG. 21 illustrates a graphical representation of the addition of a new vertex;

FIG. 22 illustrates a graphical representation of the deactivation of a vertex;

FIG. 23 illustrates a graphical representation of the addition of a new edge;

FIG. 24 illustrates a graphical representation of the deactivation of an edge;

BEST MODE FOR CARRYING OUT THE INVENTION

I. Environment of the Present Invention

Figure 1:
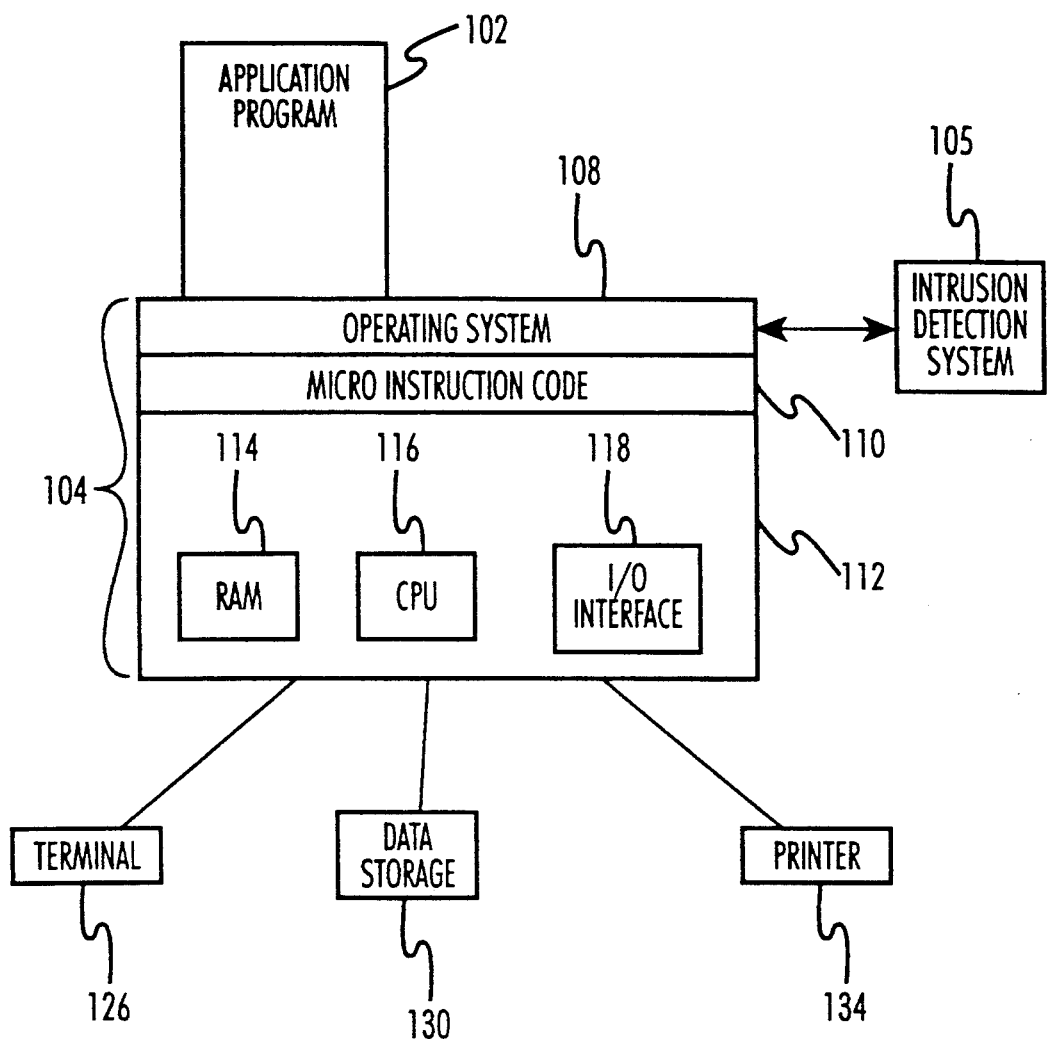
FIG. 1 illustrates an environment in which the preferred embodiment of the present invention operates.

FIG. 1 illustrates an environment in which a preferred embodiment of the present invention operates. The preferred embodiment of the present invention operates on a computer platform 104. The computer platform 104 includes certain hardware units 112, including one or more central processing units (CPUs) 116, a random access memory (RAM) 114, and an input/output interface 118. The computer platform 104 includes an operating system 108, and may include microinstruction code 110. An intrusion detection system 105, configured and operated in accordance with the present invention, is operated concurrently with operating system 108. For a general discussion of data security see Denning, *Cryptography and Data Security*, Addison-Wesley Publishing Co. (1982).

One or more application programs 102 can be executed by computer platform 104. Various peripheral components may be connected to the computer platform 104, such as a terminal 126, a data storage device 130, and a printing device 134.

In a preferred embodiment of the present invention, the computer platform 104 is an International Business Machines AT personal computer. The IBM personal computer is equipped with Secure Xenix®. Secure Xenix® includes an audit detection mechanism which was modified with the pattern-intrusion detection model of the present invention.

II. A Pattern-Oriented Intrusion-Detection Model

The intrusion detection system and method of the present invention can best be explained with reference to a pattern-oriented, intrusion-detection "model". Below is a discussion of some of the model's salient properties, and an illustration of two of its applications (detection of unintended use of foreign programs and detection of virus propagation). (Other applications, which help distinguish the use of this model from that of others, includes that of auditing covert storage-channel use (see Shieh, et al., *Auditing the Use of Covert Storage Channels in Secure Systems*, Proc. of the 1990 IEEE Symp. on Res. in Sec. and Privacy, pp. 285-295, Oakland, Calif. (May 6-9, 1990).

The model presented here is inspired by the use of the Take-Grant model (see Bishop, M., *Theft of Information in the Take-Grant Protection Model*, Proc. of the Comp. Sec. Fndtn. Workshop, pp. 194-218, Franconia, N.H. (June 1988); Jones et al., *A Linear Time Algorithm for Deciding Security*, Proc. of the 17th An. Symp. on the Fndtns. of Comp. Sci. (1976); Snyder, L., *Formal Models of Capability-Based Protection Systems*, IEEE Trans. on Comps., Vol. C-30(3), pp. 172-181 (March 1981); and Snyder, L., *Theft and Conspiracy in the Take-Grant protection Model*, J. Comp. and System Sci., Vol 23, pp. 333-347 (Dec. 1981)) and the U-KUANG rule-based tool (see Baldwin, R. W., *Rule Based Analysis of Computer Security*, Technical Report, Mass. Inst. of Tech., (March 1988)) for static analysis of system protection states; e.g., for the static determination of whether a subject can potentially acquire object privileges or data. However, in contrast to the Take-Grant model and the U-KUANG tool, the model of the present invention captures the dynamic flow of object privileges and data, thereby enabling the definition and discovery of specific intrusion patterns in audit trails.

In particular, the present invention helps define patterns of object privilege and data flows that characterize operational security problems in otherwise secure systems. These problems include those caused by (1) the unintended use of foreign programs, (2) the unintended use of foreign input data, (3) the imprudent choice of default privileges, and (4) the use of weak protection mechanisms. However, as is the case with any model that requires explicit definition of intrusion patterns, the present invention detects only intrusions that can be anticipated prior to their occurrence. In general, pattern-oriented intrusion detection is intended to complement, not replace, statistical approaches for intrusion detection.

A. Operational Security Problems

Operational security problems, such as those caused by imprudent use of object privileges, inadequate setting of name-resolution variables, or execution of foreign programs that may contain Trojan Horse or virus codes, can be eliminated neither by use of access control and authentication mechanisms nor by administrative measures. These problems affect both systems employing discretionary and non-discretionary access controls, and may be caused by both privileged, administrative users and unprivileged, casual users. Four of the many types of operational problems leading to context-dependent intrusions, and which suggest the use of pattern-oriented approach to intrusion detection are described below. The problems are described with reference to the Unix ® operating system. The Unix ® operating system is used only for illustrative purposes, and it should be noted that, similar examples could have been described with reference to other operating systems.

(1) Unintended Use of Foreign Programs

Unintended use of foreign programs is a common operational problem in many Unix ® systems. This problem can be caused by failures to set and reset the environment variables (see Bishop M., *Security Problems with the Unix ® Operating System*, Tech. Rpt., Dept. of Comp. Sci., Purdue Univ., West Lafayette, Ind., pp.1–28 (1983); Bishop, M., *How to Write a Setuid Program*, Proc. of the 1987 Winter USENIX, vol. 12, No. 1, pp. 5–11 (1987); and Discolo, A. V., *4.2BSD Unix Security*, Tech. Rpt , Dpt. Compt. Sci., U. of Cal. at Santa Barbara, pp. 1–16 (1985)) For example, whenever the Bourne shell sh is used, an environment variable IFS is used to define a list of characters representing word separators for commands. If IFS is set to 'o,' then the shell command show (which prints mail messages on the screen) is treated as the command sh with one argument w (since the 'o' is treated as a blank). Thus, whenever an unsuspecting user fails to set or reset IFS, another user may set up a file w, which can include command programs under the control of the latter user. Similar problems appear if other environment variables, such as PATII, are not carefully set or reset by users.

(2) Unintended Use of Foreign Input Data

Misuse of the environment variables that cause unintended use of foreign programs in example (1) can also cause unintended use of foreign input data. However, more subtle instances of unintended use of foreign data also appear in Unix ® systems. For example, a miscreant user may exploit the fact that directories tmp and /usr/tmp, provide a writable repository for the creation of temporary files by system programs like cc(1). Since these directories must be readable and writable by everyone, a miscreant user is free to remove any or all files saved there and replace them with his own files. cc(1) may take these intermediate files as unintended input and generate (unintended) executable files. The resulting operational problem is that an unsuspecting user may end up using bogus input data and programs with the same effects as those of example (1).

(3) Imprudent Choice of Default Privileges

Operating systems, such as Unix ®, allow users to define default object privileges. For example, a user may set his default-privilege mask to allow: (1) all privileges for the owner, (2) read-write privileges for a specified group of users, and (3) read privilege for all other users whenever he creates an object. Object privileges can be subsequently modified to accommodate the needs of different sharing patterns. The user editing a sensitive document stored in a file may modify the file's privileges to allow read-only privileges for the group and no-privileges for other users. Suppose, however, that an editor, running with the user identity, creates a new temporary file (which has the default privileges set by the user mask), copies the contents of the original file in it, edits it, destroys the original file, and renames the temporary file with the name of the original file. The unsuspecting user appears now to have granted read access to all other users, perhaps contrary to the wishes of the group members; also, the group members gain inadvertently write access to the document file, perhaps contrary to the unsuspecting user's wishes. In this context, subsequent read access to the document file exercised by other users and write access exercised by the group represents an intrusion. The use of unsafe object-privilege defaults is a very common operational security problem in most (secure) systems.

(4) Use of Weak Protection Mechanisms

Compatibility with existing system interfaces requires retention of protection mechanisms visible at a system interface even when these mechanisms are demonstrably weak or unsafe. The setuid/setgid system calls of Unix ® systems, which are intended to help implement protected subsystems (Saltzer, et al., *The Protection of Information in Computer Systems.* Proc. of the IEEE 63(9):1278–1308 (Sept. 1975)), represent a good example of this requirement. Hypothetically, a secure system would not use such mechanisms within its trusted base but, nevertheless, would retain them for discretionary use by various applications. In such a system, a user may (un)intentionally call a foreign program that creates a setuid file with the user's identity, unbeknownst to the user. The effect of this seemingly innocuous create-file call is that the owner of the foreign program, which would be granted read and write privileges on the file, could copy to, and run programs from, that file under the user's identity. The resulting operational problem, namely the ability of a user to masquerade as another user, cannot be avoided easily because casual users often lack the ability or permission necessary to discover the potential use of setuid like calls by untrusted application code. (Trusted Xenix is the only Unix ®-like system which corrects the above problem by placing the setuid/setgid commands in the trusted path and by allowing only the owner of a file to execute setuid/setgid commands on that file (see Gligor, et al., *Design and Implementation of Secure XENIX,* IEEE Transactions on Software Engineering, vol. SE-13, No. 2, pp. 208–221 (February 1987); Hecht et al., *Unix without the Superuser,* 1987 Summer USENIX Conf., Phoenix, Ariz. (Summer 1987)). Additional operational problems caused by the use of the setuid mechanism are described in Bishop, M., "Security Problems with the Unix ® Operating System," Tech. Rpt., Dept. of Comp. Sci., Purdue Univ., West Lafayette, Ind. pp. 1–28 (1983); and Bishop, M., *Proc. of the* 1987 *Winter USENIX* 12(1):5–11 (1987).

The above examples show that seemingly innocuous access patterns may, in fact, represent intrusion patterns whenever they appear in the context of specific sets of subjects and objects.

B. Access Patterns: Intrusion versus Innocuous Activity

In this section the access patterns that need to be analyzed for intrusion-detection purposes in terms of basic relations and sequences of relations among subjects and objects are characterized. In addition, the notion of access context that helps discriminate between an intrusion and an innocuous access is defined.

(1) Access Pattern Representation

The basic subject accesses to objects can be defined as a set of direct and indirect relations among subjects and objects, and divided into two classes of access depending on whether the accesses cause a flow of object data or of privileges. Read and write relations are introduced to capture the flow of an object data. A subject has a direct read relation with every object it reads; at the same time, the subject has an indirect read relation with all subjects and objects that provided input to the write operation on that object. Similarly, a subject has a direct write relation with every object it writes; at the same time, the subject has an indirect write relation with all objects that will be written by other subjects that take input from the subject. Note that, to capture data flow dependencies among subjects and objects, both indirect read and write relations must include specific sequencing of direct read and write relations. For example, if process 1 writes a file before process 2 reads it, process 1 has an indirect write relation with any object written by process 2 and, conversely, process 2 has an indirect read relation with process 1. However, if process 1 writes the file after process 2 reads it, no indirect relation can be established between the two processes. Other indirect write relations exist and are described in Section C.

Two other basic relations, namely controlled-by and drive, are introduced to capture the flow of object privileges. A subject is directly controlled by an object if the subject executes the object, or if the subject receives input from the object. For example, whenever a process executes a Unix ® shell command such as sh and csh, it creates a child process to execute commands read from the objects such as .login and .cshrc. Therefore, this process is controlled by sh or csh and by .login or .cshrc, depending upon which shell it executes and which file it reads. A subject directly drives another subject whenever the former provides a command to the latter. The drive relation differs from the controlled-by relation because the controlled-by relation provides a subject with a sequence of instructions for execution and usually lasts for a period of time, whereas the drive relation is an instantaneous operation that only provides a subject with the command or program to be executed.

A subject is indirectly controlled (1) by another subject, if the latter directly or indirectly wrote the object which directly controls the former, or (2) by another object, if that object provided input to a write operation on the object which directly controls the subject. A given subject is indirectly driven (1) by another subject, if the latter directly or indirectly controls a subject which directly drives the former, or (2) by another object, if that object directly or indirectly controls a subject which directly drives the given subject.

(2) Access Contexts

Access contexts are defined in terms of (1) protection sets and (2) their core subsets. A protection set defines the set of all subjects and objects that require protection from intrusion by outside subjects. Object data and privileges are allowed to flow freely within a protection set. The selection of the size of a protection set is left to the latitude of users and administrators, and reflects the intrusion detection requirements of specific applications. For example, an auditor may select a collection of all subjects and objects owned by a user at a given security level, a collection of a group of cooperative processes, or a collection of subjects and objects owned by a group of users working on the same project for a protection set. A core subset is the subset of a protection set in which elements should be always protected from intrusion by subjects from outside the protection set. We distinguish four types of core subsets:

objects, (2) the core (1) the core subset of non-writable subset of non-readable objects and subjects, (3) the core subset of non-controllable subjects, and (4) the core subset of non-drivable subjects. Unless otherwise specified, the elements of the core subsets cannot be directly or indirectly written, read, controlled, and driven by subjects outside of a protection set. If any element of a core subset is accessed by a subject or an object outside of its protection set and the access violates the given restriction (e.g. non-writable) of the core subset, an intrusion occurs.

Protection sets help define the targets of intrusion detection. Core subsets are particularly useful in distinguishing between legitimate activities and intrusions. Sensitive files of Unix ®, such as .login, .cshrc, .profile, a user's login directory, system commands, and setuid files, should be included in their owners' core subsets of non-writable objects. Sensitive or privileged subjects, such as superuser's processes, users' login shells, etc., should be included in their owners' core subsets of non-controllable subjects. In addition, all subjects and objects of protected subsystems should be protected from other users (see Saltzer, et al., *The Protection of Information in Computer Systems*, Proc. of the IEEE, vol 63, No. 9, pp. 1278-1308 (September 1975)). Therefore, all subjects and objects in a protected subsystem should be included in its core subset.

C. The Intrusion-Detection Model

In this section, a succinct definition of the intrusion detection model is provided by formally defining system states, state transitions, direct relations, and rules that establish indirect relations between subjects and objects.

The system states captured in audit trails can be represented by a protection graph. A protection graph has two distinct types of vertices: subjects and objects. Subjects are the active vertices, and can represent processes and users; they can initiate operations and pass information and privileges. Objects, on the other hand, are completely passive; they can represent files, directories, etc., and cannot initiate operations.

(1) System States

A system state $G_i$ is an element of G, where G is the set of protection graphs (PGs): $G = V \times E \times C \times K$ where V is the set of vertices: $V = \{v1, v2, v3, \ldots\} = S \cup 0$; E is the set of labeled edges: $E = \{e1, e2, e3, \ldots\}$; $C = \{C1, C2, C3, \ldots\}$ and $C_i$ is a protection set, $C_i \subseteq V$; $K = (K1, K2, K3, \ldots)$ and $K_i$ is a core subset, $K_i \subseteq C_i$; S is the set of subjects, and a subject s, s ∈ S, is represented by ◯ in a protection graph. ◯ is the set of objects, and an object o, o ∈ ◯, is represented by ☐ in a protection graph. A vertex $v_i$, vi ∈ V, that can be a subject or an object is represented by ⊠. Each edge e connects elements of an ordered pair of vertices {u, v}, and is labeled with subsets of a finite relation set R, where $R = \{r, w, cb, d, Ir, Iw, Icb, Id, r^*, w^*, cb^*, d^*, Ir^*, Iw^*, Icb^*, Id^*\}$. Symbols r, w, d, and cb represent present read, write, drive, and is-controlled-by relations, respectively; and Ir, Iw, Id, Icb represent indirect relations which are originally derived from direct relations such as r, w, d, and cb. Symbol * is the past unary operator. For example, w(a, b) represents a writes b and w*(a, b) represents a wrote b.

Intrusion detection is concerned with the distinction between two epochs: the past and the present. The present epoch begins at the start of the particular operation under consideration. All operations performed before this time are considered to be in the past. The execution of any operation takes time and cannot finish instantaneously. However, if all operations are executed sequentially, that is, if no operations are interleaved and all operations are always completed without any interruption, then these operations can be treated as instantaneous operations. For example, operations read, write, and drive can be treated as instantaneous direct relations. In contrast to direct relations, an indirect relation cannot be treated as an instantaneous relation because it consists of a sequence of direct relations that are usually interleaved. In addition, present direct controlled-by is the only type of present direct operation that can occur simultaneously with other types of present direct operations.

To represent access patterns, we define three types of sequencing operators in the model: (1) an ordering operator, (2) a concurrent execution operator, and (3) a next-state temporal operator. The ordering operator, denoted by $<$, is used between two relations to mean that the relation on its left occurs before the relation on its right. For example, indirect relation $L1 < L2$ indicates that L1 finishes before L2 starts. That is, every single direct relation of L1 occurs before L2 starts. The ordering operator is important for sequencing indirect relations. The concurrent-execution operator, denoted by $||$, indicates that two access relations take place simultaneously. The next-state operator, denoted by 0, is the next-state operator in Temporal Logic, see Kroger, Fred, *Temporal Logic of Programs*, Springer-Verlag (1987). ○P represents "P holds at the time point immediately after the reference point."

Core subsets are denoted by Ki and protection sets by $C_i$. The four types of core subsets defined in Section B are denoted as Kow (the core subset of non-writable objects), Kor and Ksr (the core subsets of non-readable objects and subjects, respectively), Ksc (the core subset of non-controllable subjects), and Ksd (the core subset of non-drivable subjects). A protection set Ci includes a subset of subjects, Csi, and a subset of objects, Coi, where $C_i = Csi \cup Coi$; a core subset $K_i$ includes subsets of subjects, Ksci, Ksdi and Ksri, and subsets of objects, Kori and Kowi, where $Ki = Ksci \cup Ksdi \cup Ksri \cup Kori \cup Kowi$. Note that $Csi \cap Coi = \phi$, $Ksi \subseteq Csi$ and $Koi \subseteq Coi$. The set of vertices connecting to vertex v with 'e' edges entering v is represented by v_set(in, e, v), and |v_set(in, e, v)| is the total number of vertices in v_set(in, e, v). The set of protection sets that have at least one element connecting to vertex v with 'e' edge leaving v is represented by C_set(out, e, v), and |C_set(out, e, v)| is the total number of protection sets in C_set(out, e, v).

(2) State Transitions

Figures 2, 3, 4:
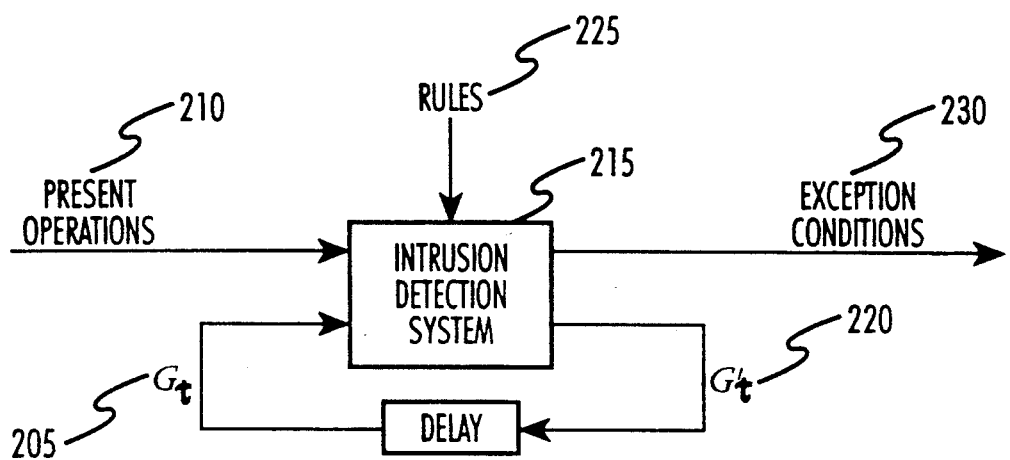
FIG. 2 shows a high level block diagram of the pattern-oriented intrusion-detection system of the present invention.
FIG. 3 illustrates a graphical representation of a direct reads/read relation.
FIG. 4 illustrates a graphical representation of a direct write/wrote relation.

Referring to FIG. 2, the state of a computer system changes as a result of present access operations. Thus, the present access operations 210 and the present protection graph 205 (present system state) must be input to the intrusion detection system 215 to detect intrusion patterns. Using this input, the intrusion detection system 215 generates a new protection graph 220 and exception-conditions 230, if any, by applying a set of model rules 225. The exception conditions 230 tell the operating system (not shown) that there is a problem (i.e., there has been an intrusion) in the audit trail. In other words, a pattern in the protection graph 205 has been detected by the intrusion detection system 210 that matches a set of pre-determined intrusion patterns.

After all the rules 225 have been applied and all the new edges have been derived, the new protection graph 220 defines the next state. As shown in FIG. 2, $G_t$ is the protection graph at time t before any rules are applied; $G_t'$ is the protection graph at time t after all the applicable rules have been applied. Note that $G_t = G_{t-1}'$.

The state transition of a system is formally defined as follows:

$$T: \mathscr{L}c \times G \rightarrow G \times D$$

where $\mathscr{L}c$ is the set of present access relations and $\mathscr{L}c = V \times A \times V$, $A = \{r, w, cb, d\}$ and D is the set of exception-condition results. In the graphic definition of the state-transition rules, the symbol $\vdash$ is used to represent that the graph following this is produced by the graph-rewriting rules on the graph preceding it.

(3) Direct Access Relations

Figure 5:
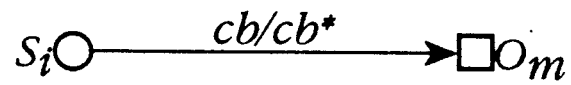
FIG. 5 illustrates a graphical representation of a direct is/was controlled-by relation.
Figure 6:
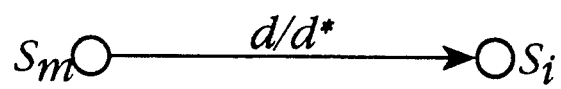
FIG. 6 illustrates a graphical representation of a direct drives/drove relation.

The definition of read and write relations are made with regard to information flow operations and the definition of controlled-by and drive relations are made with regard to privilege flow operations. The definitions of four direct relations, (a) read, (b) write, (c) controlled-by, and (d) drive, are as follows:

(a) A subject $s_i$ reads/read an object $o_m$: represented by relation $r\{s_i, o_m\}/r^*(s_i, o_m)$; FIG. 3 shows a graphical representation of this relation;

(b) A subject $s_m$ writes/wrote an object $o_n$: represented by relation $w(s_m, o_n)/w(s_m, o_n)$; FIG. 4 shows a graphical representation of this relation;

(c) A subject $s_i$ is/was controlled by an object $o_m$: represented by relation $cb(s_i, o_m)/cb^*(s_i, o_m)$; FIG. 5 shows a graphical representation of this relation; and (d) A subject $s_m$ drives/drove a subject $s_i$ if $s_m$ provides/provided the next command (or program) to be executed by $s_i$. This is represented by relation $d(s_m, s_i)/d^*(s_m, s_i)$; FIG. 6 shows a graphical representation of this relation.

(4) Indirect Access Relations and Model Rules

All of the indirect relations are generated from interaction between subjects and objects and their corresponding direct relations. Each of the four model rules defining indirect relations includes two other relations. At least one of these other relations is a present direct relation. Rules 1 to 4 illustrate how indirect relations can be derived from the invocation of present direct relations. For example, $r(s_n, o_i)$ in Rule 1, $w(s_i, o_n)$ in Rule 2, $cb(s_n, o_i)$ in Rule 3, and $d(s_i, s_n)$ in Rule 4 are present direct relations.

Figure 7:
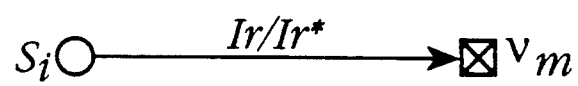
FIG. 7 illustrates a graphical representation of an indirect reads/read.
Figure 8:
FIG. 8 illustrates a graphical representation of an indirect read given a first sequence of relations.
Figure 8:
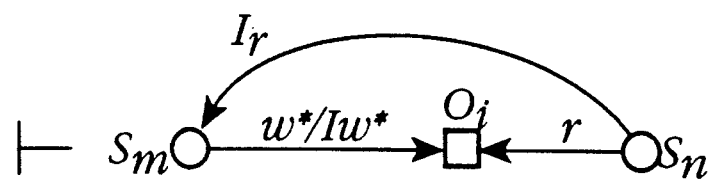

Indirect read is represented by the relation $Ir/Ir^*(s_i, v_m)$, if a subject $s_i$ indirectly reads/read an object (or a subject) $v_m$. FIG. 7 shows a graphical representation of this relation. Indirect read is achieved through the following sequences of relations:

Rule 1-1. $w^*/Iw^*(s_m, o_i) \wedge r(s_n, o_i) \rightarrow Ir(s_n, s_m)$; FIG. 8 shows a graphical representation of this relation.

Figure 9:
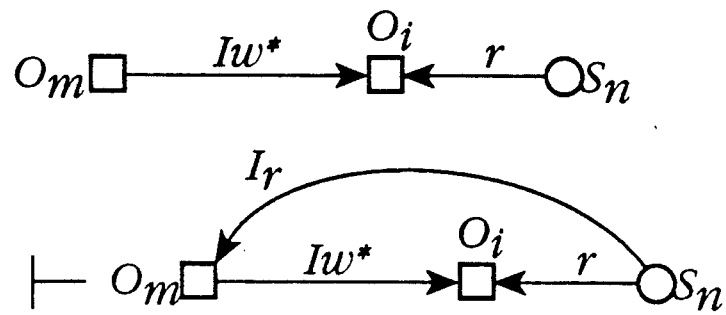
FIG. 9 illustrates a graphical representation of an indirect read given a second sequence of relations.

Rule 1-2. $Iw^*(o_m, o_i) \wedge r(s_n, o_i) \rightarrow Ir(s_n, o_m)$; FIG. 9 shows a graphical representation of this relation.

Figure 10:
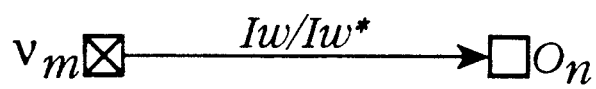
FIG. 10 illustrates a graphical representation of an indirect write/wrote.
Figure 11:
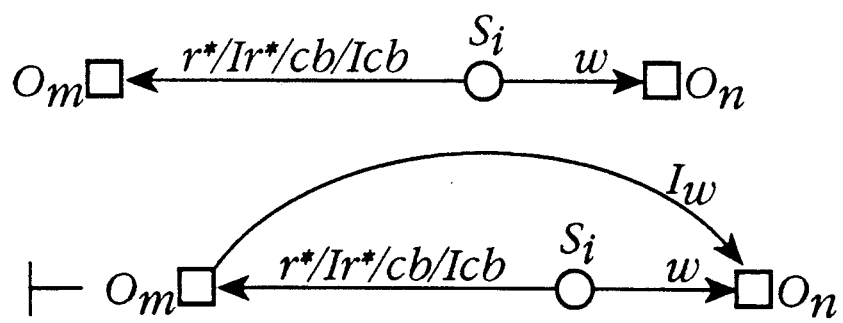
FIG. 11 illustrates a graphical representation of an indirect write given a first sequence of relations.

Indirect write is represented by the relation Iw-/Iw*($v_m$, $o_n$), if a subject (or object) $v_m$ indirectly writes/wrote an object $o_n$. FIG. 10 shows a graphical representation of this relation. Indirect write is achieved through the following sequences of relations:

Rule 2-1. r*/Ir*/cb/Icb($s_i$, $o_m$) Λ w($s_i$, $o_n$)=Iw($o_m$, $o_n$); FIG. 11 shows a graphical representation of this relation.

Figure 12:
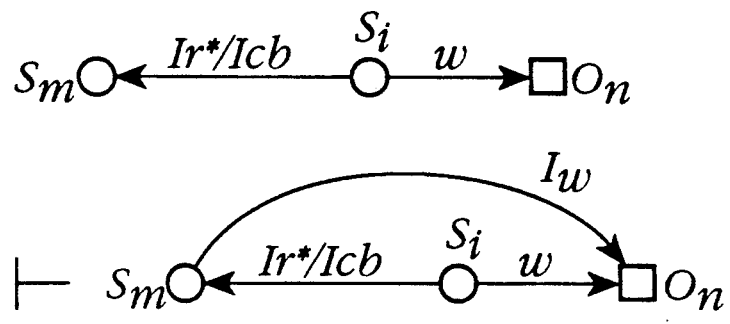
FIG. 12 illustrates a graphical representation of an indirect write given a second sequence of relations.

Rule 2-2. Ir*/Icb($s_i$, $s_m$) Λ w($s_i$, $o_n$)=Iw($s_m$, $o_n$); FIG. 12 shows a graphical representation of this relation.

Figure 13:
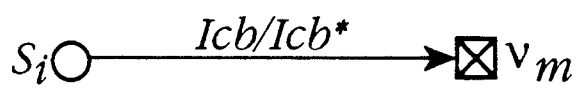
FIG. 13 illustrates a graphical representation of when a subject is/was indirectly controlled by an object.
Figure 14:
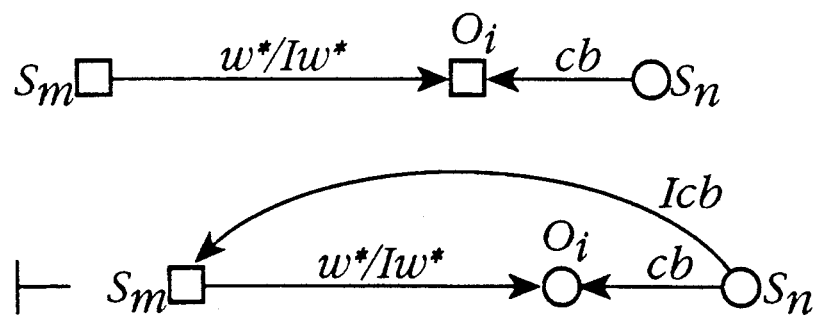
FIG. 14 illustrates a graphical representation of an indirect is-controlled-by relation given a first sequence of relations.

Indirect controlled-by is represented by the relation Icb/Icb*($s_i$, $v_m$), if a subject $s_i$ is/was indirectly controlled by an object (or subject) $v_m$. FIG. 13 shows a graphical representation of this relation. Indirect controlled-by is achieved through the following sequences of relations:

Rule 3-1. w*/Iw*($s_m$, $o_i$) Λ cb($s_n$, $o_i$)→Icb($s_n$, $s_m$); FIG. 14 shows a graphical representation of this relation.

Figure 15:
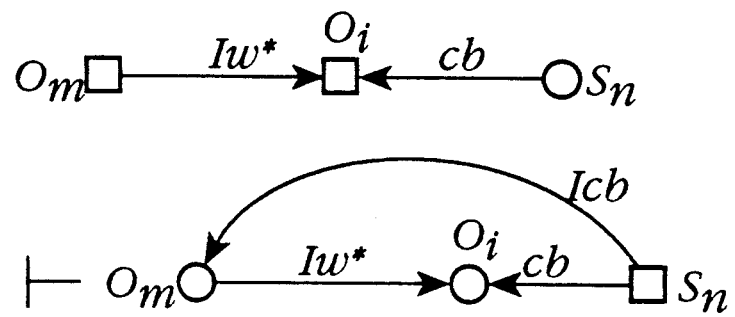
FIG. 15 illustrates a graphical representation of an indirect is-controlled-by relation given a second sequence of relations.

Rule 3-2. Iw*($o_m$, $o_i$)→cb($s_n$, $o_i$)=Icb($s_n$, $o_m$); FIG. 15 shows a graphical representation of this relation.

Figure 16:
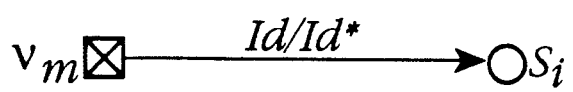
FIG. 16 illustrates a graphical representation of an indirect drives/drove.
Figure 17:
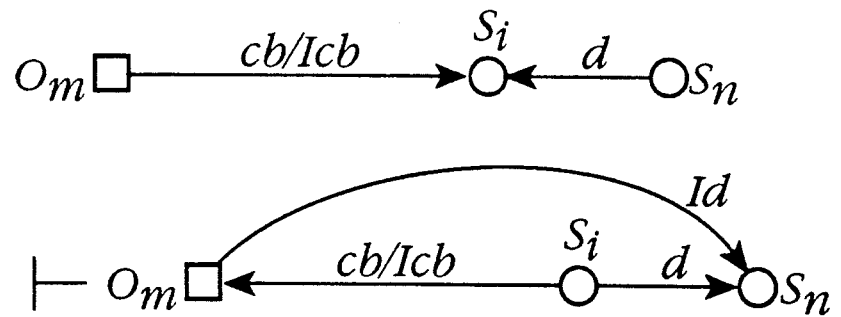
FIG. 17 illustrates a graphical representation of an indirect drives given a first sequence of relations.

Indirect drive is represented by the relation Id-/Id*($v_m$, $s_i$), if a subject (or object) $v_m$ indirectly drives/drove a subject $s_i$, that is, if $v_m$ provides the next command to be executed by $s_i$. FIG. 16 shows a graphical representation of this relation. Indirect drive is achieved through the following sequences of relations:

Rule 4-1 cb/Icb($s_i$, $o_m$)Λ($s_i$, $s_n$)→Id($o_m$, $s_n$); FIG. 17 shows a graphical representation of this relation.

Figure 18:
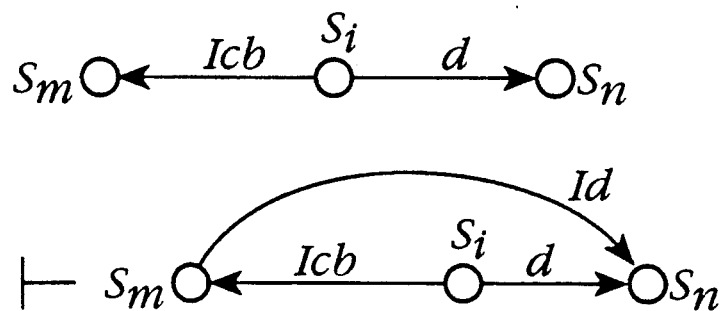
FIG. 18 illustrates a graphical representation of an indirect drives given a second sequence of relations.

Rule 4-2. Icb($s_i$, $s_m$)Λd($s_i$, $s_n$)→. Id($s_m$, $s_n$); FIG. 18 shows a graphical representation of this relation.

Figure 19:
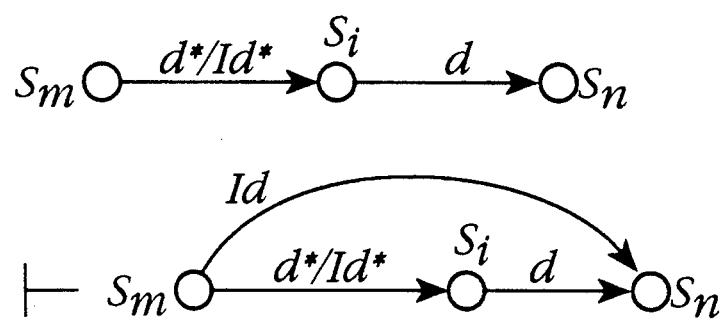
FIG. 19 illustrates a graphical representation of an indirect drives given a third sequence of relations.

Rule 4-3. d*/Id*($s_m$, $s_i$)Λd($s_i$, $s_n$)→Id($s_m$, $s_n$); FIG. 19 shows a graphical representation of this relation.

Figure 20:
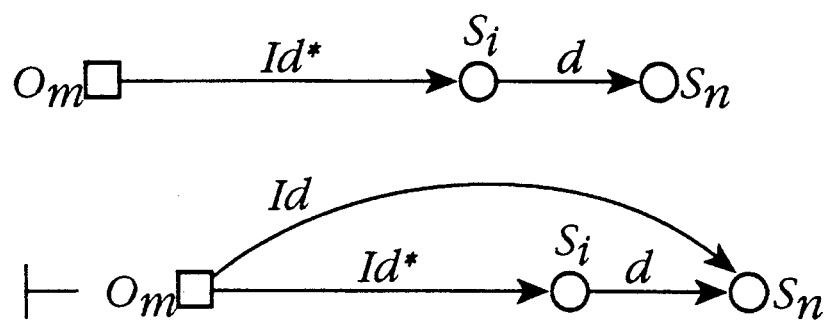
FIG. 20 illustrates a graphical representation of an indirect drives given a fourth sequence of relations.

Rule 4-4. Id*($o_m$, $s_i$)Λd($s_i$, $s_n$)→Id($o_m$, $s_n$); FIG. 20 shows a graphical representation of this relation.

The distinction between a solid edge and a dotted edge, as used in Rule 8 (described below), is that dotted-edge relations have no effect on the current activities of the vertices adjacent to them. This means that Rule 1 to 4 cannot apply to dotted-edge relations. The distinction between solid vertices and dotted-vertices is that dotted vertices cannot initiate or accept any direct operations. Let $\alpha$, $\beta$, $\delta \subseteq R$, $\alpha \subseteq \beta$ and λ represent a null vertex. We have the following rules:

Rule 5 (Add vertex) λ→$v_m$. FIG. 21 shows a graphical representation of this rule.

Rule 6 (Deactivate vertex) $\beta'$($s_i$, $v_m$)Λ($v_m$, $v_j$)→$\beta'$($v_i$, [$v_m$])Λ$\beta''$([$v_m$], $v_j$) FIG. 22 shows a graphical representation of this rule.

Rule 7 (Add edges) $\beta$($s_i$, $v_m$)→$\beta$+$\delta$($s_i$, $v_m$) FIG. 23 shows a graphical representation of this rule.

Rule 8 (Deactivate edges) $\beta$($v_i$, $v_m$)→$\beta$−$\alpha$($v_i$, $v_m$) FIG. 24 shows a graphical representation of this rule.

The first three rules above are self-explanatory. We use two Unix ® system-call examples, namely exece( ) and creat( ), to illustrate the use of Rules 4 to 8. The exece( ) system call invokes another program, overlaying the memory space of the process with a copy of the executable file. When a subject invokes exece( ), the subject is directly self-driven. Applying Rule 4, this subject is indirectly driven by those subjects or objects which directly or indirectly control it. After the successful return of exece( ), the subject is controlled by a new object. All adjacent relations with outgoing label cb*/Icb* from the subject are deactivated (ref. Rule 8, deactivated edges) because this subject is no longer controlled by those subjects or objects. (The past execution code is removed from memory space and replaced by the code of that new object.)

The second system-call example is provided by the invocation of creat( ). When a subject invokes creat( ) on an existing object, the length of the object is truncated to zero. That is, all stored data is removed. Therefore, all the relations labeled w*/Iw from other vertices to that object are deactivated (Rule 8). When creat( ) is invoked on a new file in a directory, a new vertex is added (Rule 5) and the directory is directly written (a new edge is added by Rule 7). When an object in a directory is removed, the vertex is deactivated (Rule 6) and the directory is written.

Two relations are called adjacent if they share a graph vertex. Note that Rules 1 to 4 discussed above only apply to a present direct relation and its adjacent relations. The "present relation" is provided by the access operation under current consideration. The "present relation" can be interpreted as the latest event read from the audit trail. All access operations performed before the present access operations are past operations. All the present operation on a protection graph must be carried out before the next event is read in the audit trails. Otherwise, an indirect relation may be missed.

Equations (1) to (6) (provided below) characterize all types of present indirect operations which are derived from a present direct relation and its adjacent relations. These equations show that the only event order which needs to be maintained is that which distinguishes past operations from present direct operations. Therefore, the updates of the protection graph need not track the order of all operations. Thus, if all past direct and indirect relations are shown in a protection graph, the application of rules 1 to 4 to those relations adjacent to present direct relations is sufficient to discover all new indirect relations.

Equations (1) through (6) are as follows:

$$Ri(s_m, v_n) \rightarrow \exists \; w*/Iw*(v_n, o_i) \land \exists \; r(s_m, o_i) \qquad (1)$$

$$Iw(v_m, o_n) \rightarrow \exists \; r*/Ir*/cb/Icb(s_i, v_m) \land \exists \; w(s_i, o_n) \qquad (2)$$

$$Icb(s_m, v_n) \rightarrow \exists \; w*/Iw*(v_n, o_i) \land \exists \; cb(s_m, o_i) \qquad (3)$$

$$Id(v_m, s_n) \rightarrow [\exists \; cb/icb(s_i, v_m) \land \exists \; d(s_i, s_n)] \lor [\exists \; d*/Id*(v_m, s_i) \land \exists \; d(s_i, s_n)] \qquad (4)$$

$$Iw(o_x, o) \rightarrow \{\exists \; r*/cb(s_{t1}, o_x) \lor [\exists \; Iw*(o_x, o_{t1}) \prec \exists \; r*/cb(s_{t1}, o_{t1})]\} \land \exists \; w(s_{t1}, o_y) \qquad (5)$$

$$Iw(s_x, o_y) \rightarrow [\exists \; w*/Iw*(s_x, o_u) \prec \exists \; r*/cb(s_u, o_u)] \land \exists \; w(s_u, o_y) \qquad (6)$$

Note that, if the present protection graph only contains direct relations, that is, all past indirect relations are missing, then applying Rules 1 to 4 to those direct relations adjacent to present direct relations is insufficient to discover all new indirect relations.

D. Application of the Intrusion-Detection Model

In this section, the detection of (1) unintended use of a foreign program, and (2) virus propagation by using the model presented in Section C is illustrated.

(1) Detecting the Unintended Use of Foreign Programs

The unintended use of foreign programs can be caused by the inadequate setting of the user's command search paths in Unix ® systems. Two types of problems may arise: (1) a user may execute an intruder's version of a system command instead of the intended system command whenever the user's command search paths start from the current directory; (2) a user may execute a system command instead of the intended user program if the user's search paths start from a system command directory. These two problems cannot be easily resolved because: (1) it is undesirable to require users to type full path names for every program execution, and (2) it is unrealistic to expect all users to understand the effects of the search-path setting on their executed programs. The following example illustrates the effect of the execution of an intruder's version of a system command, instead of the intended system command, by an unsuspecting user.

In UNIX ®, user applications often access the /tmp directory, which can be read, written and executed by every user in the system. This implies that, for example, a user (identified below as the Intruder) may deliberately leave an executable file named ls in directory /tmp and then change the owner of /tmp/ls (to anther identity denoted by ssp below) such that his real identity cannot be discovered later. Subsequently, an unsuspecting user (identified below as the Victim) may change his current directory to /tmp and attempt to list current directory contents by using (what he believes to be the system-provided command) ls. If the Victim's first search path is set to the current directory, then the bogus version of ls gets executed instead of the system command ls. Thus, the bogus ls can acquire all the Victim's privileges, thereby controlling all his activities and allowing the Intruder to (albeit indirectly) write over the unsuspecting user's sensitive objects; e.g., setup files .login and .cshrc. In this context, these seemingly normal actions of the bogus ls program represent intrusions.

The Intruder's actions may be summarized as follows:
$ cp I_write /tmp/ls
$ chmod 0111 /tmp/ls
$ chown ssp /tmp/ls The Victim's actions may be summarized as follows:
$ cd /tmp
$ ls The contents of the /tmp/ls file created by the Intruder is shown below.

```
/************************************************************
 *   PROGRAM NAME: ls
 *   PATH: /tmp/ls
 *   FUNCTION:
 *   1. indirectly write to $HOME/.login &
 *      $HOME/cshre
 *   2
 *      list the names of files in a directory
 ************************************************************/
#include <stdio.h>
#include <fcntl.h>
#define FAIL      -1
#define LENGTH  20
char templ[6]="/tmp ", temp2[6];
char token[11]="set path=(";
int fdl;
main(argc, argv)
int argc;
char *argv[ ];
{
  int fd, n, i;
  char buff[BUFSIZ], path[LENGTH], *ptr,
    *getenv( );
  /*get owner's home dir*/
    if((ptr=getenv("HOME"))==NULL)exit(-1);
    strcpy(path,ptr);
```

```
-continued
/*get pathname of owner's .login*/
   strcat(path, "/.login");
   if((fd = open(path, O_RDWR | O-CREAT |
      O_APPEND, 0666))==FAIL)exit(-1);
   chmod)path, 0666);
/*change the searth path for commands in
   $HOME/.cshrc*/
   strcpy(path, ptr);
   strcat(path, "/.cshrc");
   if((fd1 = open(path, O_RDWR | O_CREAT,
      0666))==FAIL)exit(-1);
   chmod(path 0666);
   change_path( );
/*append a command to $HOME/.login*/
   write(fd, "/tmp/ls", 7);
/*execute the intended ls command*/
   execv("/bin/ls", argv);
}
change_path( )
{
   int i, n;
   lseek(fd1, OL, O);
   if(search_token( )==O){
      while((n=read(fd1, temp2. 5))==5){
         lseek(fdl, -5L, 1);
      write(fdl, templ. 5);
         for ( i = O ;  i < 5 ;
         i++)templ{i}=temp2{i};
      }
      lseek(fdl, -1L*(long)n, 1);
      write(fdl, temp1. 5);
      write(fdl, temp2, n);
   }
   else write(fdl, "set path=(/tmp . /bin)", 17);
}
/*search token "set path=("*/
search_token( )
{
   int i=0;
   char c;
   while(read(fdl, &c, 1)!=O){
      if(c == token[i++]){
         if(i == 10)return(O);/*size of
            taken*/
      }
      else i = O;
   }
   return(-1);
}
/************************************************************/
```

The Command "set path=(. $HOME/bin /bin /usr/bin /usr/security/bin /etc)" is a typical command found in users' .cshrc files on UNIX ®-like system to set up a user's command search paths. After the execution of program /tmp/ls, the Victim's command search paths in his $HOME/.cshrc is changed to "set path=(/tmp . $HOME/bin /bin usr/bin /usr/ security/bin /etc)" and a new line "/tmp/ls" is appended to the end of $HOME.login. Thus, both .cshrc and .login files of the Victim can be affected by the Intruder.

As the consequence of the commands invoked by Intruder and Victim, the following events can be selected from audit trails:

| process | user | primitive | object | time |
| --- | --- | --- | --- | --- |
| 111 | Intruder | write | /tmp/ls | 10:01 |
| 222 | Victim | exec | /tmp/ls | 11:01 |
| 222 | Victim | write | $HOME/.login | 11:02 |
| 222 | Victim | write | $HOME .cshrc | 11:03 |

This sequence of events is interpreted by our model as the sequence of protection graphs shown below. At time 10:01, process 111 (owner Intruder) writes into /tmp/ls, as shown in the graph illustrated in FIG. 25a.

Figure 25B:
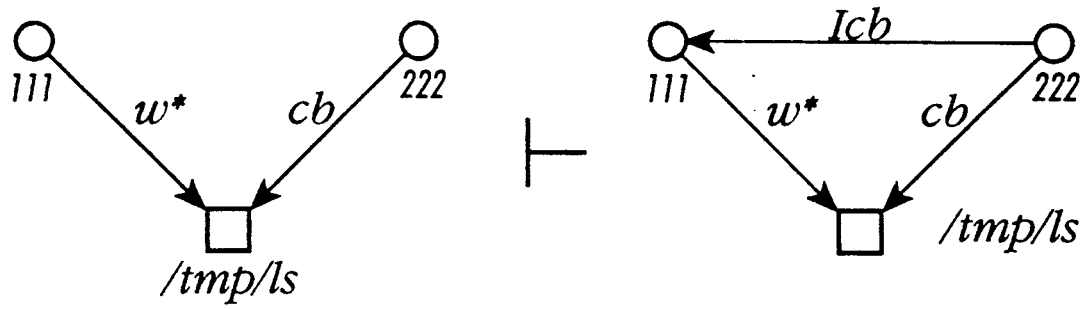
FIG. 25, which consists of FIGS. 25(a) through 25(d), shows an example of detecting the unintended use of a foreign program.

At time 11:01, process 222 (owner Victim) starts being controlled by /tmp/ls. For simplicity, the previous object executed by process 222 is not shown in the graph. The direct-write relation between process 111 and /tmp/ls is a past relation because the operation occurred in the past. A new indirect controlled-by relation between processes 111 and 222 can be derived from the direct controlled-by relation between process 222 and /tmp/ls, as illustrated in FIG. 25b.

Figure 25C:
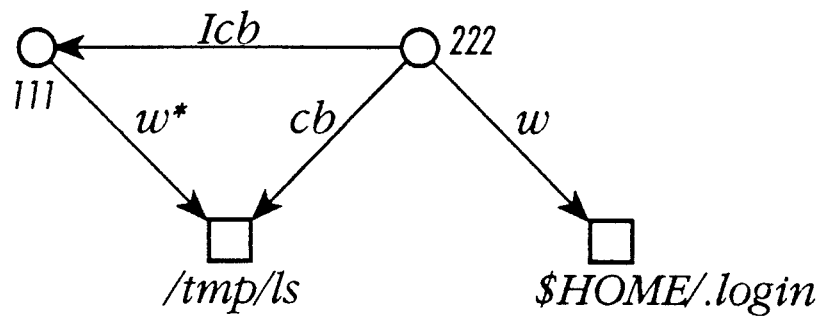
Figure 25C:
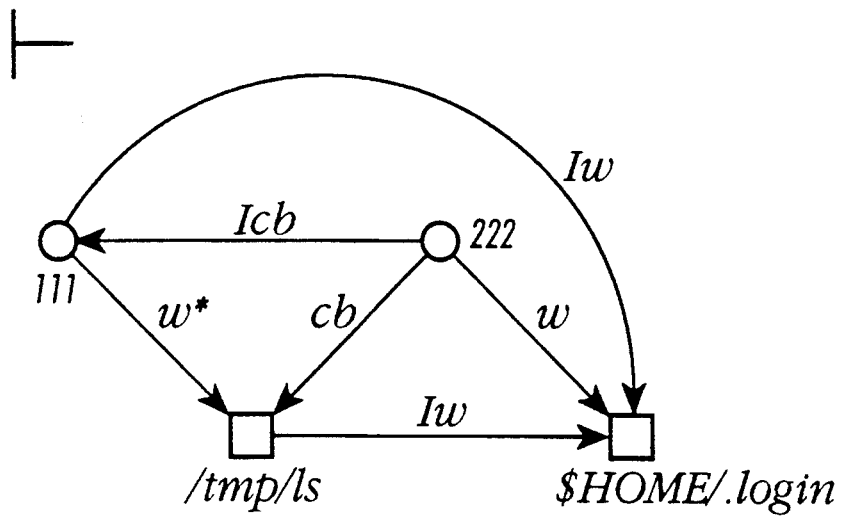

At time 11:02, process 222 writes data into $HOME/.login. A new indirect-write relation between process 111 and $HOME/.login and a new indirect-write relation between tmp/ls and $HOME/.login can be derived, as illustrated in FIG. 25c.

Figure 25D:
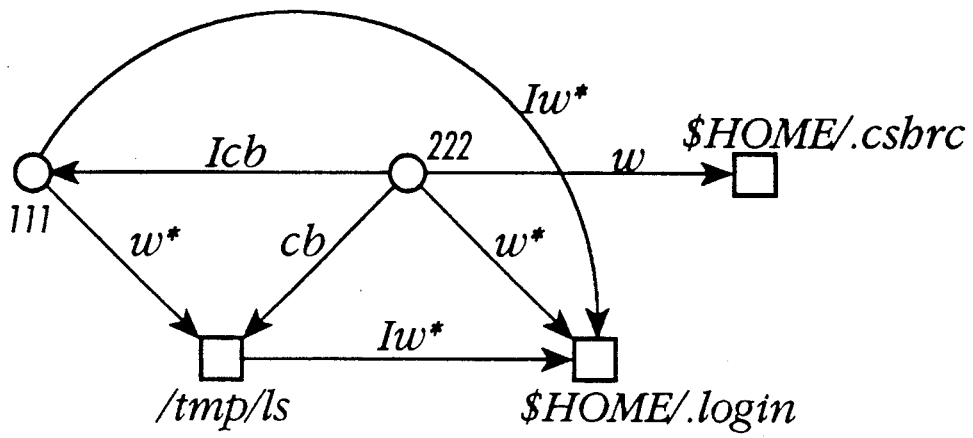
Figure 25D:
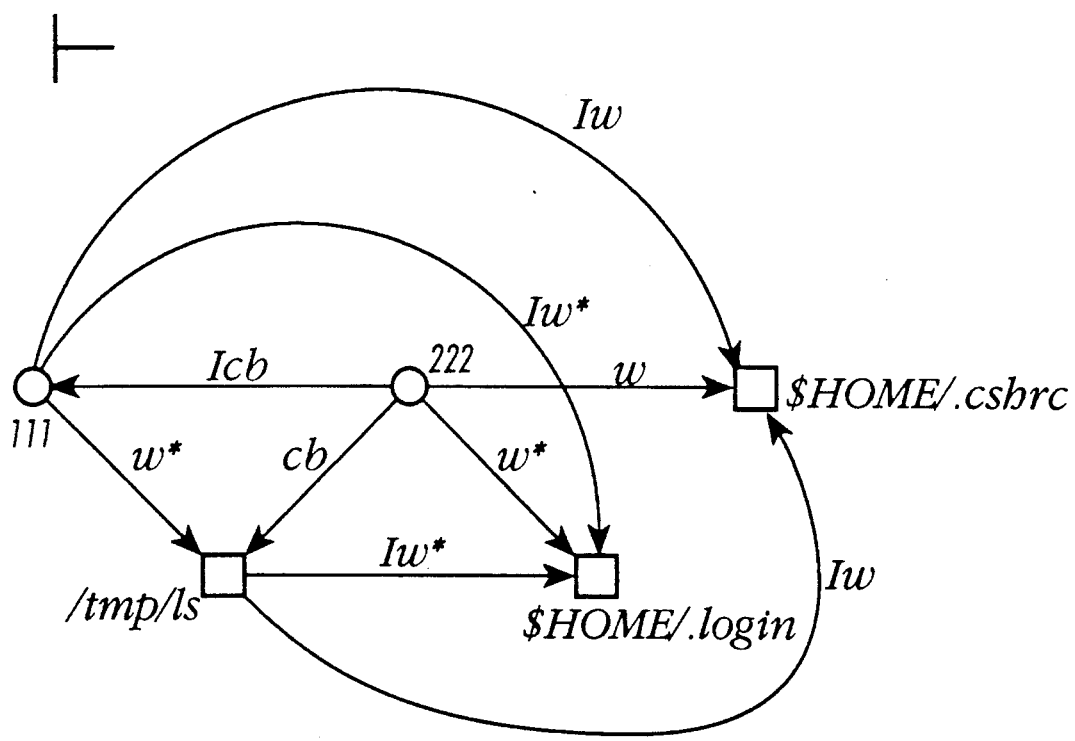

At time 11:03, process 222 writes data into $HOME/.cshrc. A new indirect-write relation between process and $HOME/.cshrc and a new indirect-write relation between tmp/ls and $HOME/.cshrc can be derived, as illustrated in FIG. 25d.

The fact that there are two indirect writes into a object that is located in a core-subset indicates that there has been an intrusion.

Access relations between vertices can be recorded in Access Logging Lists (ALLs). An ALL, which can be associated with a subject or object, contains entries that record relations between vertices. The ALL of a subject or object contains the names of all subjects and objects that accessed that subject or object. Thus, if a relation exists between two vertices in a protection graph, it can be represented by two entries, one in each ALL.

The ALLs corresponding to the subjects and objects of the protection set selected for our example are shown below.

| Victim/.cshrc's ALL | |
|---|---|
| wb | Victim |
| Iwb | Intruder |
| Iwb | /tmp/ls |
| Victim/.login's ALL | |
| wb* | Victim |
| Iwb* | Intruder |
| Iwb* | /tmp/ls |
| /tmp/ls's ALL | |
| wb* | Intruder |
| Iw* | $HOME/.login |
| Iw | $HOME/.cshrc |
| c | Victim |
| 111's ALL | |
| w* | /tmp/ls |
| Ic | Victim |
| Iw* | $HOME/.login |
| Iw | $HOME/.cshrc |
| 222's ALL | |
| cb | /tmp/ls |
| Icb | Intruder |
| w* | $HOME/.login |
| w | $HOME/.cshrc |

The structure of an ALL can be simplified by reducing the number of its entries and by removing irrelevant or redundant information. In our example, process 222, Victim/.chsrc and Victim/.login belongs to Victim's protection set. Although /tmp/ls has been created by the Intruder, /tmp/ls belongs to ssp's protection set after its owner was changed to ssp by the Intruder. Thus, subjects in a vertex's ALL can be replaced by their owner's name. Entries of indirectly-written-by relations with other objects listed in an ALL cannot be replaced by their owners' names because (1) these objects' owners may not write them, and (2) these objects may actually represent covert-channel variables. In case (1) the objects do not contain their owners' data, and in case (2) the objects may not have owners. Furthermore, unless auditors decide to retain them to track data and privilege flow paths, entries of indirectly-written-by relations with other objects listed in an ALL can be removed. This is the case because objects are not the active elements (that is, they cannot be intruders) and only provide input to write operations on the object associated with the ALL. Thus, the ALL associated with Victim/.cshrc's in the example above can be simplified as shown below.

| Victim/.cshrc's ALL (Simplified) | |
|---|---|
| wb | Victim |
| Iwb | Intruder |

A further simplification results from the deletion redundant past relations; i.e., multiple past relations of the same type. Maintaining multiple past relations of the same type between two vertices cannot provide any additional useful information. However, indirect-write relations with other object identities cannot be removed from ALLs, because these entries are essential to the detection of covert-channel use and virus propagation. Similar simplification of other entries in ALLs is possible.

(2) Detecting Potential Virus Propagation

The intrusion-detection model presented in the previous section can be used to detect potential propagation of typical viruses. The most frequently used method for virus propagation requires an infected process to write a piece of code into another file while running a virus program. This action can be represented in the model as $[cb(s_1 \text{virus} \parallel W(s_1, o_2)]$. Thus, by Rule 3-1, $[cb(s_1, \text{virus } w(s_1, o_2)] \rightarrow Iw(\text{virus}, o_2)$. Three typical approaches to Virus propagation (see Cohen, F., *Computer Viruses: Theory and Experiments*, Proceedings of the 7th National Computer Security Conference, pp. 240–263 (1984)) can be used to illustrate the use of the intrusion detection model in this area. The first approach is simply to copy the disk file containing the virus after reading it. The direct copying of the disk file containing the virus can be represented in the model as: $[cb^*(s_1, \text{virus}) \parallel r^*(s_1, \text{virus})] \prec [cb(s_1, \text{virus}) \parallel w(s_i, o_2)] \rightarrow Iw(\text{virus}, o_2)$. If the process attempting to propagate the virus has only execute access to the file but, nevertheless, has read access to executable-code segments, it can read its code segments as well as its data segments, convert them to the disk-file format, and write them onto another disk file copy. This way the infected process does not need to read the original disk-file in order to make a copy.

The second approach to virus propagation requires that the process $s_1$ forks a child process $s_2$ and has the child process execute system command cp (copy) to make copies of the virus program. This can be described formally using Rules 4-1, 2-1 as $[cb (s_1, \text{virus}) \parallel d^*(s_1, s_2)] \prec [cb^*(s_2, c_p) \parallel r^*(s_2, \text{virus})] \prec [cb(s_2, c_p) \parallel w(s_2, o_3)] \rightarrow Id^*(\text{virus}, s_2) \wedge Iw(\text{virus}, o_3)$. In this type of virus propagation, a process always makes copies of the file which "indirectly drove" it.

The third approach to virus propagation requires that an infected process writes a piece of code, which has a similar function as cp, into a second file $o_2$ then forks a child process $s_2$ to run $o_2$. The child process copies the virus to a third file $o_3$ By Rules 4-1, 2-1, 3-2, this sequence of operations can be formalized as $[cb^*(s_1, \text{virus}) \parallel w^*(s_1, o_2)] \prec [cb(s_1, \text{virus}) \parallel d^*(s_i, s_2)] \prec [cb^*(s_2, o_2) \parallel r^*(s_2, \text{virus})] \prec [cb(s_2, o_2) \parallel w(s_2, o_3)] \rightarrow \text{Id}.(\text{virus}, s_2) \wedge \text{Icb}(s_2, \text{virus}) \wedge \text{Iw}(\text{virus}, o_3)$. In this type of virus propagation, a process always makes copies of the file which "indirectly drove" and "indirectly controlled" it.

From the application of the model rules to the direct relations shown in the three approaches to virus propagation presented above, it can be concluded that a virus must indirectly write other files to propagate itself, that is $\text{Iw}(\text{virus}, o_i)$. Consequently, after the virus propagation proceeds for a period of time, the original virus will have the highest frequency of indirect write to other files.

The indirect-write pattern of virus propagation, namely $\text{Iw}(\text{virus}, o_i)$, may appear individually or simultaneously and can be detected by the model of the present invention using the following conditions: (1) $|v\_\text{set}(\text{out}, \text{Iw}/\text{Iw}^*, \text{virus})| > \text{threshold}$ and a large portion of elements are executable files; (2) $|C\_\text{set}(\text{out}, \text{Iw}/\text{Iw}^*, \text{virus})| > \text{threshold}$; (3) $|v\_\text{set}(\text{in}, \text{cb}/\text{cb}^*/\text{Icb}/\text{Icb}^*, \text{virus})| > \text{threshold}$; (4) $|C\_\text{set}(\text{in}, \text{cb}/\text{cb}^*/\text{Icb}/\text{Icb}^*, \text{virus})| > \text{threshold}$; (5) $v\_\text{set}(\text{out}, \text{Id}/\text{Id}^*, \text{virus})| > \text{threshold}$; (6) $|C\_\text{set}(\text{out}, \text{Id}/\text{Id}^*, \text{virus})| > \text{threshold}$. The used here are parameters defining limits to determine abnormal process behavior. If the occurrences of a pattern exceeds the threshold, an abnormality occurs.

(a) Characteristics of Virus Propagation

Figure 26:
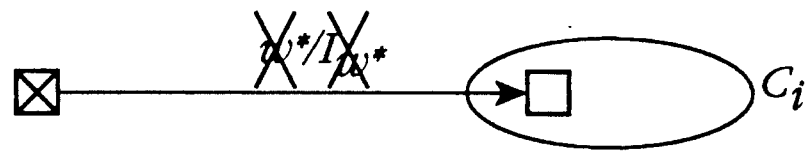
FIG. 26 illustrates a graphical representation of a virus-free set.

The present invention can be used to detect the existence of viruses by detecting virus-propagation patterns. In particular, it can help discover whether a protection set can be infected by a virus originating outside of the protection set, and whether a virus could propagate outside of its originating protection set. We define the virus-free protection set and a virus-confinement protection set as follows:

A protection set $C_i$ is a virus-free set if all objects of $C_i$ have not been written (directly/indirectly) by other protection sets. Formally, $\not\exists \, w^*/IW \, (v_g, o_i)$, where $o_i \in C_i$, $v_g \not\in C_i \rightleftharpoons P_i$. Predicate $P_i$ denotes that protection set $C_i$ is a virus-free set. FIG. 26 shows a graphical representation of a virus-free set.

Figure 27:
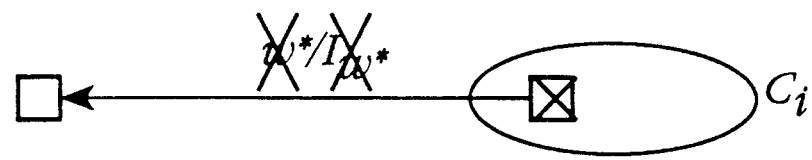
FIG. 27 illustrates a graphical representation of a virus-confinement set.

A protection set $C_i$ is a virus-confinement set if subject of $C_i$ have not (directly/indirectly) written objects of other sets. Formally, $\not\exists \, w^*/Iw^*(v_i, o_g)$, where $v_i \in C_i$, $o_g \not\in C_i \rightleftharpoons Q_i$. Predicate $Q_i$ denotes that protection set $C_i$ is a virus-confinement set. FIG. 27 shows a graphical representation of a virus-confinement set.

Figure 28:
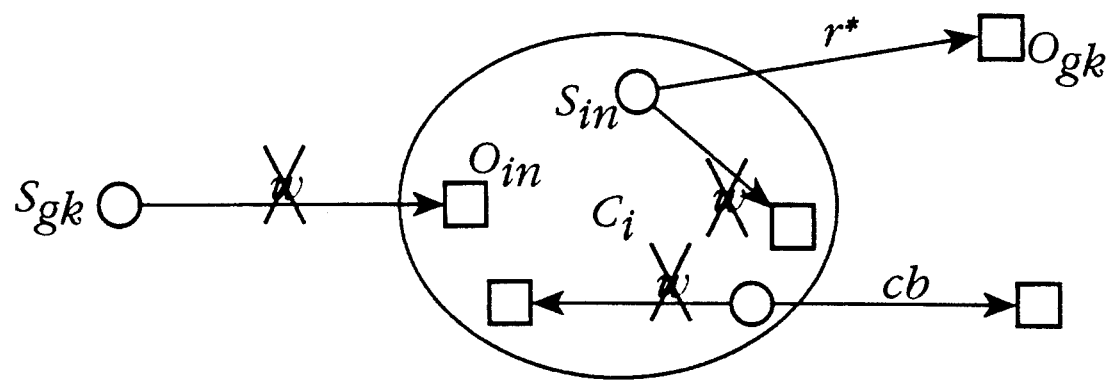
FIG. 28 illustrates a graphical representation of a virus-free next state.

The present invention can detect if present direct operations can lead to the infection of a presently virus-free protection set at the next state. Thus, if a protection set $C_i$ is virus-free and present direct relations do not lead to direct write or indirect write relations from outside vertices to any objects of $C_i$, then $C_i$ will be virus-free in the next state. Consequently, if a protection set was not infected when the system was initialized, then the protection of objects in the set can be ensured by applying this principle. Formally, $\forall \, S_{in}, o_{in} \in C_i$, $\forall \, S_{gk}, o_{gk} \not\in C_i, P_i \wedge \not\exists w(s_{gk}, o_{in}) \wedge [\not\exists r^*/cb(s_{in}, o_{gk}) \vee \not\exists w(s_{in}, o_{in})] \rightarrow OP_i$. FIG. 28 shows a graphical representation of this principle.

Figure 29:
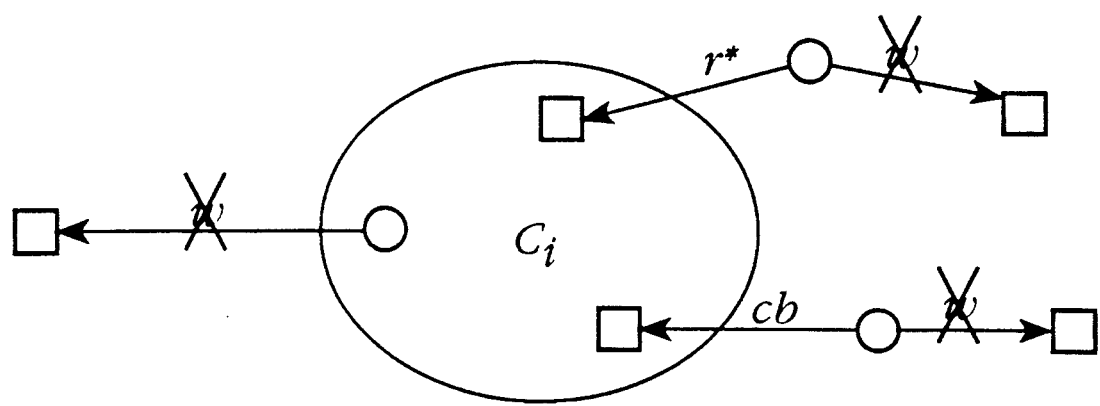
FIG. 29 illustrates a graphical representation of a virus-confined next state.

The present invention can detect if any present operations can propagate a virus at the next stage. Thus, if $C_i$ is a virus-confined set and present direct operations do not lead to direct write or indirect write relations to any objects outside $C_i$, then $C_i$ will be virus-confined in the next state. Thus, if a protection set remain virus-confined after the system is initialized, then the virus confinement property of this protection set can be maintained by applying this principle. Formally, $\forall \, s_{ik}, o_{ik} \in C_i, \forall \, s_{gk}, o_{gk} \not\in C_i, Q_i \wedge \not\exists \, w(s_{in}, o_{gk}) \wedge [\not\exists r^*/cb(s_{gk}, o_{in}) \vee \not\exists w(s_{gk}, o_{gk}))] \rightarrow OQ_i$, FIG. 29 shows a graphical representation of this principle.

(b) A Procedure for Discovering Indirect Write Relations

The following procedure derives all the new indirect write relations when a present direct write relation occurs. The protection graph $PG_B$ contains all the past direct and indirect access relations, and protection graph $PG_A$ contains all the indirect relations derived by application of the model rules.

---

Procedure:
Input: present direct write relation $w(s1,o1)$, $PG_B$
(protection graph before the application of any rules)
Output: $PG_A$ (protection graph after the application of rules)
Procedure update_graph ( $w(s1, o1)$, $PG_B$ )
  begin
    $PG = \{w(s1,o1)\} \cup PG_{bb}$
    while $\exists \, r^*/Ir/cb/Icb(s1, vi)$
      $PG = \{Iw(vi, o1)\} \cup PG$;
    $PG_A = PG$;
    return($PG_A$);
  end

---

In the procedure above, the protection graph $PG_B$ is updated whenever a direct write access relation is found. Other algorithms that help derive all instances of indirect read, indirect controlled-by, indirect drive relations are omitted because of their similarity to the above algorithm.

The complexity of this algorithm is in $O(n)$, where n is the total number of vertices in a protection graph $PG_B$. The maximum number of vertices that directly or indirectly write a vertex is n in the worst case.

E. Conclusion

A pattern-oriented intrusion detection model is defined here. The key advantage of this model is its ability to characterize context-dependent patterns of intrusion, such as those present in covert-channel use and in virus propagation. As with any pattern-oriented model of intrusion detection, the present invention requires the explicit definition of individual intrusion patterns prior to analysis of audit trails. It is contemplated that future intrusion-detection systems will rely on both the pattern-oriented and the statistical approaches, thereby combining the advantages of both.

Finally, the present invention can be easily adapted to other applications beyond those mentioned above. For example, the detection of internet worms, the information and privilege flows within a distributed ATM banking system, and the improvement of reliability and consistency of distributed data bases.

While the invention has been particularly shown and described with reference to a preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A method for detecting intrusion patterns in a secure computer system having a Central Processing Unit and a data storage memory, the method comprising the steps of:
   (1) performing an access operation on one or more components of the computer system;
   (2) inputting a first protection graph into an intrusion detection system, said first protection graph including direct and indirect relations between subjects and objects;
   (3) applying a set of model rules to said first protection graph and said access operation to generate a second protection graph;
   (4) comparing said second protection graph with a set of intrusion patterns to generate an exception condition, said exception condition indicative of whether there has been an intrusion; and
   (5) indicating the existence of an intrusion based on said exception condition.

2. The method of claim 1, wherein said first and second protection graphs are generated by storing access relations in access logging lists (ALLs), wherein said All is associated with either a subject or an object and contains indentities of all other subjects or objects that accessed said associated subject or object.

3. The method of claim 2, wherein said ALL can be simplified, said simplification comprising the steps of:
   (a) replacing all subjects in said at least one ALL with said subjects owner's name;
   (b) removing all entries from said at least one ALL that represent indirectly-written-by relations with other objects; and
   (c) deleting all redundant past relations from said at least one ALL.

4. The method of claim 2, wherein said ALL can be simplified by determining whether a first subject in said ALL indirectly reads a second subject or object in said ALL.

5. The method of claim 2, wherein said ALL can be simplified by determining whether a subject or a first object in said ALL indirectly writes a second object in said ALL.

6. The method of claim 2, wherein said ALL can be simplified by determining whether a first subject in said ALL is indirectly controlled by a second subject or object in said ALL.

7. The method of claim 2, wherein said ALL can be simplified by determining whether a first subject or object in said ALL indirectly drives a second subject in said ALL.

8. The method of claim 2, wherein said ALL can be simplified by determining whether a first object in said ALL indirectly writes a second object in said ALL.

9. The method of claim 2, wherein said ALL can be simplified by determining whether a subject in said ALL indirectly writes an object in said ALL.

10. The method of claim 1, further comprising the step of detecting virus propagation by observing indirect write patterns in said second protection graph, wherein said indirect write patterns may appear individually or simultaneously.

11. The method of claim 1, wherein said first protection graph contains all past direct and indirect relations, and said second protection graph contains all present and past direct and indirect relations, and wherein said step of generating a second protection graph further comprises the step of applying only said model rules to those relations adjacent to said present direct relations to generate said present indirect relations.

12. The method of claim 1, further comprising the step of delineating a protection set and a core subset from said subjects and said objects.

13. The method of claim 12, further comprising the step of checking to determine whether said protection set is a virus-free set by determining if any object in said protection set have been written to by other protection sets.

14. The method of claim 12, further comprising the step of checking to determine whether said protection set is a virus-confinement set by determining if any subjects in said protection set have written objects of other protection sets.

15. The method of claim 12, wherein said step of generating exception conditions comprises the step of determining if an intrusion has occurred by checking whether any element of said core subset is accessed by a subject or an object outside of its protection set and whether the access violates a given restriction of said core subset.

16. The method of claim 1, wherein said step of generating a second protection graph comprises the step of providing an indirect read relation in said protection graph between a first subject and a second subject if a direct wrote operation or an indirect wrote operation exists between said first subject and a first object and a read operation exists between said second subject and said first object.

17. The method of claim 1, wherein said step of generating a second protection graph comprises the step of providing an indirect read relation in said protection graph between a subject and a first object if an indirect wrote operation exists between said first object and a second object and a read operation exists between said subject and said second object.

18. The method of claim 1, wherein said step of generating a second protection graph comprises the step of providing an indirect write relation in said protection graph between a first object and a second object if a read operation or an indirect read operation or a is-controlled-by operation or a indirectly is-controlled-by operation exists between a subject and said first object and a write operation exists between said subject and said second object.

19. The method of claim 1, wherein said step of generating a second protection graph comprises the step of providing an indirect write relation in said protection graph between a first object and a subject if an indirect read operation or an indirect is-controlled-by operation exists between said subject and said first object and a write operation exists between said subject and said second object.

20. The method of claim 1, wherein said step of generating a second protection graph comprises the step of providing an indirect is-controlled-by relation in said protection graph between a first subject and a second subject if a wrote operation or an indirect wrote operation exists between said first subject and an object and said second subject is controlled by said object.

21. The method of claim 1, wherein said step of generating a second protection graph comprises the step of providing an indirect is-controlled-by relation in said protection graph between a subject and a first object if an indirect wrote operation exists between said first object and a second object and said subject is controlled by said second object.

22. The method of claim 1, wherein said step of generating a second protection graph comprises the step of providing an indirect drive relation in said protection graph between an object and a first subject if said first subject is-controlled-by or indirectly is-controlled-by said object and said first subject drives said second subject.

23. The method of claim 1, wherein said step of generating a second protection graph comprises the step of providing an indirect drive relation in said protection graph between a first subject and a second subject if said first subject is indirectly controlled-by a third subject and said third subject drives said second subject.

24. The method of claim 1, wherein said step of generating a second protection graph comprises the step of providing an indirect drive relation in said protection graph between a first subject and a second subject if said first subject drove or indirectly drove a third subject and said third subject drives said second subject.

25. The method of claim 1, wherein said step of generating a second protection graph comprises the step of providing an indirect drive relation in said protection graph between an object and a first subject if said object indirectly drove a second subject and said second subject drives said first subject.

26. The method of claim 1, wherein the first protection graph and said second protection graph are stored in the data storage memory.

27. The method of claim 1, wherein said set of intrusion patterns are stored in the data storage memory.

28. The method of claim 1, further comprising the step of analyzing the privilege and data flows captured in said second protection graph to determine which access operation caused said intrusion.

29. In a secure computer system having a central processing unit and a data storage memory, and intrusion detection system for detecting intrusion patterns and unauthorized access, comprising:
(1) means for performing an access operation on one or more components of the computer system;
(2) means for inputting a first protection graph into an intrusion detection system, said first protection graph including direct and indirect relations between subjects and objects;
(3) means for applying a set of model rules to said first protection graph and said access operation to generate a second protection graph;
(4) means for comparing said second protection graph with a set of instruction patterns to generate an exception condition, said exception condition indicative of whether there has been an intrusion; and
(5) means for indicating the existence of an intrusion based on said exception condition.

30. The system of claim 29, wherein said first and second protection graphs are generated by storing access relations in access logging lists (ALLs), said ALL is associated with either a subject or an object and contains identities of all other subjects or object that accessed said associated subject or object.

31. The system of claim 29, wherein said first protection graph contains all past direct and indirect relations, and said second protection graph contains all present and past direct and indirect relations, and wherein said means for generating a new protection graph comprises means for applying only said model rules to those relations adjacent to said present direct relations to generate said present indirect relations.

32. The system of claim 29, further comprising means for delineating a protection set and a core subset from said subjects and said objects.

33. The system of claim 32, further comprising means for generating exception conditions by determining whether an intrusion has occurred by checking whether any element of said core subset is accessed by a subject or an object outside of its protection set and whether the access violates a given restriction of said core subset.

34. The system of claim 32, further comprising means for checking whether said protection set is a virus-free set by determining if any object in said protection set have been written to by other protection sets.

35. The system of claim 32, further comprising means for checking whether said protection set is a virus-confinement set by determining if any subjects in said protection set have written to objects of other protection sets.

36. The system of claim 29, wherein said means for generating a new protection graph comprises means for providing an indirect read relation in said protection graph between a first subject and a second subject if a direct wrote operation or an indirect wrote operation exists between said first subject and a first object and a read operation exists between said second subject and said first object.

37. The system of claim 29, wherein said means for generating a new protection graph comprises means for providing an indirect read relation in said protection graph between a subject and a first object if an indirect wrote operation exists between said first object and a second object and a read operation exists between said subject and said second object.

38. The system of claim 29, wherein said means for generating a new protection graph comprises means for providing an indirect write relation in said protection graph between a first object and a second object if a read operation or an indirect read operation or a is-controlled-by operation or a indirectly is-controlled-by operation exists between a subject and said first object and a write operation exists between said subject and said second object.

39. The system of claim 29, wherein said means for generating a new protection graph comprises means for providing an indirect write relation in said protection graph between a first object and a subject if an indirect read operation or an indirect is-controlled-by operation exists between said subject and said first object and a write operation exists between said subject and said second object.

40. The system of claim 29, wherein said means for generating a new protection graph comprises means for providing an indirect is-controlled-by relation in said protection graph between a first subject and a second subject if a wrote operation or an indirect wrote operation exists between said first subject and an object and said second subject is controlled by said object.

41. The system of claim 29, wherein said means for generating a new protection graph comprises means for providing an indirect is-controlled-by relation in said protection graph between a subject and a first object if an indirect wrote operation exists between said first object and a second object and said subject is controlled by said second object.

42. The system of claim 29, wherein said means for generating a new protection graph comprises means for providing an indirect drive relation in said protection graph between an object and a first subject if said first subject is-controlled-by or indirectly in-controlled-by said object and said first subject drives said second subject.

43. The system of claim 29, wherein said means for generating a new protection graph comprises means for providing an indirect drive relation in said protection graph between a first subject and a second subject if said first subject is indirectly controlled-by a third subject and said third subject drives said second subject.

44. The system of claim 29, wherein said means for generating a new protection graph comprises means for providing an indirect drive relation in said protection graph between a first subject and a second subject if said first subject drove or indirectly drove a third subject and said third subject drives said second subject.

45. The system of claim 29, wherein said means for generating a new protection graph comprises means for providing an indirect drive relation in said protection graph between an object and a first subject if said object indirectly drove a second subject and said second subject drives said first subject.

46. The system of claim 29, wherein the first protection graph and said second protection graph are stored in the data storage memory.

47. The system of claim 29, wherein said set of intrusion patterns are stored in the data storage memory.

48. A method for detecting intrusion patterns in a secure computer system, wherein the state of actions in the audit trail of the secure computer system are represented by a first protection graph that includes direct and indirect relations between subjects and objects, the method comprising the steps of:
   (1) performing an access operation on one or more components of the computer system;
   (2) generating a second protection graph from the first protection graph and said access operation by applying a set of model rules, wherein said second protection graph represents the present state of action in the audit trail in the secure computer system;
   (3) comparing said second protection graph with a set of intrusion patterns to generate an exception condition; and
   (4) indicating the existence of an intrusion based on said exception condition.

49. A system for detecting intrusion patterns in a secure computer system, wherein the state of actions in the audit trail of the secure computer system are represented by a first protection graph that includes direct and indirect relations between subjects and objects comprising:
   (1) a secure computer system comprising a central processing unit and a data storage memory, wherein the operation of said secure computer system is controlled by an operating system, said secure computer system further having means for performing an access operation on one or more components of said secure computer system;
   (2) an intrusion detection system operating concurrently with said operating system, said intrusion detection system comprising,
      (a) means for applying a set of model rules to the first protection graph and said access operation to generate a second protection graph, wherein said second protection graph is stored in said data storage memory;
      (b) means for comparing said second protection graph with a set of intrusion patterns stored in said data storage memory to generate an exception condition, said exception condition indicative of whether there has been an intrusion; and
      (c) means for indicating the existence of an intrusion based on said exception conditions.

* * * * *